United States Patent
Wang et al.

(10) Patent No.: US 10,574,422 B2
(45) Date of Patent: Feb. 25, 2020

(54) RATE CONTROL ADAPTATION

(71) Applicant: QUALCOMM Incorporated, San Diego, CA (US)

(72) Inventors: Qingsi Wang, Bellevue, WA (US); Yisheng Xue, San Diego, CA (US); Siddhartha Mallik, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/016,176

(22) Filed: Jun. 22, 2018

(65) Prior Publication Data

US 2019/0013921 A1   Jan. 10, 2019

Related U.S. Application Data

(60) Provisional application No. 62/527,517, filed on Jun. 30, 2017.

(51) Int. Cl.
  *H04W 4/00* (2018.01)
  *H04L 5/00* (2006.01)
  *H04L 1/00* (2006.01)
  *H04L 1/20* (2006.01)
  *H04L 1/18* (2006.01)
  (Continued)

(52) U.S. Cl.
  CPC .......... *H04L 5/0057* (2013.01); *H04L 1/0003* (2013.01); *H04L 1/0009* (2013.01); *H04L 1/0015* (2013.01); *H04L 1/0026* (2013.01); *H04L 1/1864* (2013.01); *H04L 1/1867* (2013.01); *H04L 1/20* (2013.01); *H04L 5/0053* (2013.01); *H04L 5/0082* (2013.01); *H04W 72/0446* (2013.01); *H04L 5/001* (2013.01); *H04L 5/0023* (2013.01); *H04L 5/14* (2013.01)

(58) Field of Classification Search
  USPC .................................. 370/329, 328, 330, 331
  See application file for complete search history.

(56) References Cited

U.S. PATENT DOCUMENTS 10,271,337 B2 * 4/2019 Sagong ..................... H04L 1/00
2011/0243208 A1 * 10/2011 Shany .................. H04L 1/0015
                                                              375/224

(Continued)

FOREIGN PATENT DOCUMENTS

WO   WO-2014205644 A1   12/2014

OTHER PUBLICATIONS

International Search Report and Written Opinion—PCT/US2018/039344—ISA/EPO—dated Oct. 15, 2018.

*Primary Examiner* — Phuongchau Ba Nguyen
(74) *Attorney, Agent, or Firm* — Holland & Hart LLP

(57) ABSTRACT

Methods, systems, and devices for wireless communication are described. A method may include obtaining a first channel quality indicator (CQI) backoff value based on a first set of acknowledgment messages associated with a first subframe of a first interval; setting a modulation and coding scheme (MCS) of a first subframe of a second interval using the first CQI backoff value; obtaining a second CQI backoff value based on a second set of acknowledgment messages associated with a second subframe of the first interval; and setting a MCS of the second subframe of the second interval using the second CQI backoff value.

28 Claims, 10 Drawing Sheets

(51) Int. Cl.
*H04W 72/04* (2009.01)
*H04L 5/14* (2006.01)

(56) References Cited

U.S. PATENT DOCUMENTS

| 2013/0194940 A1* | 8/2013 | Li ........................ H04J 11/0023 370/252 |
| 2014/0286300 A1* | 9/2014 | Choi .................... H04B 7/0617 370/329 |
| 2015/0049703 A1 | 2/2015 | Nobukiyo et al. |
| 2015/0264664 A1* | 9/2015 | Kawasaki ............. H04W 24/10 370/329 |
| 2016/0381690 A1* | 12/2016 | Kim ..................... H04W 72/08 370/329 |

* cited by examiner

RATE CONTROL ADAPTATION

CROSS REFERENCES

The present application for patent claims the benefit of U.S. Provisional Patent Application No. 62/527,517 by WANG, et al., entitled "RATE CONTROL ADAPTATION," filed Jun. 30, 2017, assigned to the assignee hereof, and expressly incorporated herein.

BACKGROUND

The following relates generally to wireless communication, and more specifically to rate control adaptation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may be massive multiple-input multiple-output (MIMO) systems. Channel aging may severely impact performance of MIMO systems, such as through the introduction of rate mismatch. A base station communicating with a UE in a MIMO system may adapt rate selection to counter the impact of channel aging.

SUMMARY

According to a first technique, a base station may provide correction of rate mismatch on a per-subframe basis for an interval having multiple subframes. Each subframe may be associated with an outer-loop for rate adaptation. In some examples, a subframe may use the outer-loop to target a block error rate (e.g., 15% block error rate). That is, a channel quality indicator (CQI) backoff value may be separately selected for each subframe. A base station may obtain a first CQI backoff value based on a first set of acknowledgment messages associated with a first subframe of a first interval. The base station may set a modulation and coding scheme (MCS) of a first subframe of a second interval using the first CQI backoff value. Additionally, the base station may obtain a second CQI backoff value based on a second set of acknowledgment messages associated with a second subframe of the first interval, and set a MCS of the second subframe of the second interval using the second CQI backoff value.

According to a second technique, a base station may also provide correction of rate mismatch on a per subframe or per-TTI basis for an interval (e.g., a TXOP or a frame) that includes multiple subframes. However, in the second technique the block error rate of the outer-loop for a first subframe of the interval may function as a baseline block error rate for a remainder of subframes. That is, a computed first CQI backoff value of a first subframe serves as a baseline CQI backoff value for a remainder of subframes of the interval. Thus, for the remainder of the subframes, each individual outer-loop of these subframes targets the baseline CQI backoff value of the first subframe. For example, a base station may obtain a first CQI backoff value based on a first set of acknowledgment messages associated with a first subframe of a first interval. The base station may set a MCS of a first subframe of a second interval using the first CQI backoff value. Additionally, the base station may obtain a second CQI backoff value based on a second set of acknowledgment messages associated with a second subframe of the first interval. In the second technique, the base station may set a MCS of the second subframe of the second interval using the second CQI backoff value and the first CQI backoff value.

A method for wireless communication is described. The method may include obtaining a first CQI backoff value based at least in part on a first set of acknowledgment messages associated with a first subframe of a first interval; setting a MCS of a first subframe of a second interval using the first CQI backoff value; obtaining a second CQI backoff value based at least in part on a second set of acknowledgment messages associated with a second subframe of the first interval; and setting a MCS of the second subframe of the second interval using the second CQI backoff value.

An apparatus for wireless communication is described. The apparatus may include means for obtaining a first CQI backoff value based at least in part on a first set of acknowledgment messages associated with a first subframe of a first interval; means for setting a MCS of a first subframe of a second interval using the first CQI backoff value; means for obtaining a second CQI backoff value based at least in part on a second set of acknowledgment messages associated with a second subframe of the first interval; and means for setting a MCS of the second subframe of the second interval using the second CQI backoff value.

Another apparatus for wireless communication is described. The apparatus may include a processor, memory in electronic communication with the processor. The processor and memory may be configured to obtain a first CQI backoff value based at least in part on a first set of acknowledgment messages associated with a first subframe of a first interval; set a MCS of a first subframe of a second interval using the first CQI backoff value; obtain a second CQI backoff value based at least in part on a second set of acknowledgment messages associated with a second subframe of the first interval; and set a MCS of the second subframe of the second interval using the second CQI backoff value.

A non-transitory computer readable medium for wireless communication is described. The non-transitory computer-readable medium may include instructions operable to cause a processor to obtain a first CQI backoff value based at least in part on a first set of acknowledgment messages associated with a first subframe of a first interval; set a MCS of a first subframe of a second interval using the first CQI backoff value; obtain a second CQI backoff value based at least in part on a second set of acknowledgment messages associated with a second subframe of the first interval; and set a MCS of the second subframe of the second interval using the second CQI backoff value.

In some examples of the method, apparatus, and non-transitory computer-readable medium described above, obtaining the second CQI backoff value is further based at least in part on the first CQI backoff value. Some examples of the method, apparatus, and non-transitory computer-readable medium described above may further include processes, features, means, or instructions for determining the first CQI backoff value as an incremental step with respect to an initial value of a baseline CQI backoff value.

Some examples of the method, apparatus, and non-transitory computer-readable medium described above may further include processes, features, means, or instructions for modifying the baseline CQI backoff value based at least in part on the first CQI backoff value. Some examples of the method, apparatus, and non-transitory computer-readable medium described above may further include processes, features, means, or instructions for determining the second CQI backoff value as an incremental step with respect to the modified baseline CQI backoff value.

Some examples of the method, apparatus, and non-transitory computer-readable medium described above may further include processes, features, means, or instructions for scaling a number of positive acknowledgments in the first set of acknowledgment messages by a rank associated with the first subframe; scaling a number of negative acknowledgments in the first set of acknowledgment messages by the rank associated with the first subframe; and determining the first CQI backoff value based at least in part on the scaled number of positive acknowledgments and the scaled number of negative acknowledgments in the first set of acknowledgment messages. In some examples of the method, apparatus, and non-transitory computer-readable medium described above, determining the first CQI backoff value is further based at least in part on a reported CQI value associated with the first subframe of the first interval.

Some examples of the method, apparatus, and non-transitory computer-readable medium described above may further include processes, features, means, or instructions for scaling a difference between a number of positive acknowledgments in the first set of acknowledgment messages and a number of positive acknowledgments in the second set of acknowledgment messages by a rank associated with the first subframe and second subframe associated with the first interval; and determining the second CQI backoff value based at least in part on the scaled difference between the number of positive acknowledgments in the first set of acknowledgment messages and the number of positive acknowledgments in the second set of acknowledgment messages. In some examples of the method, apparatus, and non-transitory computer-readable medium described above, determining the second CQI backoff value is further based at least in part on a reported CQI value associated with the second subframe of the first interval.

Some examples of the method, apparatus, and non-transitory computer-readable medium described above for setting the MCS of the second subframe may further include processes, features, means, or instructions for obtaining an effective CQI value based at least in part on a reported CQI value and the first CQI backoff value; and mapping the effective CQI value to an MCS index.

Some examples of the method, apparatus, and non-transitory computer-readable medium described above may further include processes, features, means, or instructions for constraining the first CQI backoff value and the second CQI backoff value by a constant lower bound, a constant upper bound, or a combination thereof. In some examples of the method, apparatus, and non-transitory computer-readable medium described above, the first CQI backoff value and the second CQI backoff value target the block error rate of the first subframe for the second subframe and the third subframe. In some examples of the method, apparatus, and non-transitory computer-readable medium described above, the first interval or the second interval, or both comprises a plurality of subframes. In some examples of the method, apparatus, and non-transitory computer-readable medium described above, the first interval or the second interval, or both comprises a transmission opportunity (TxOP) including the plurality of subframes.

DETAILED DESCRIPTION

Figure 1:
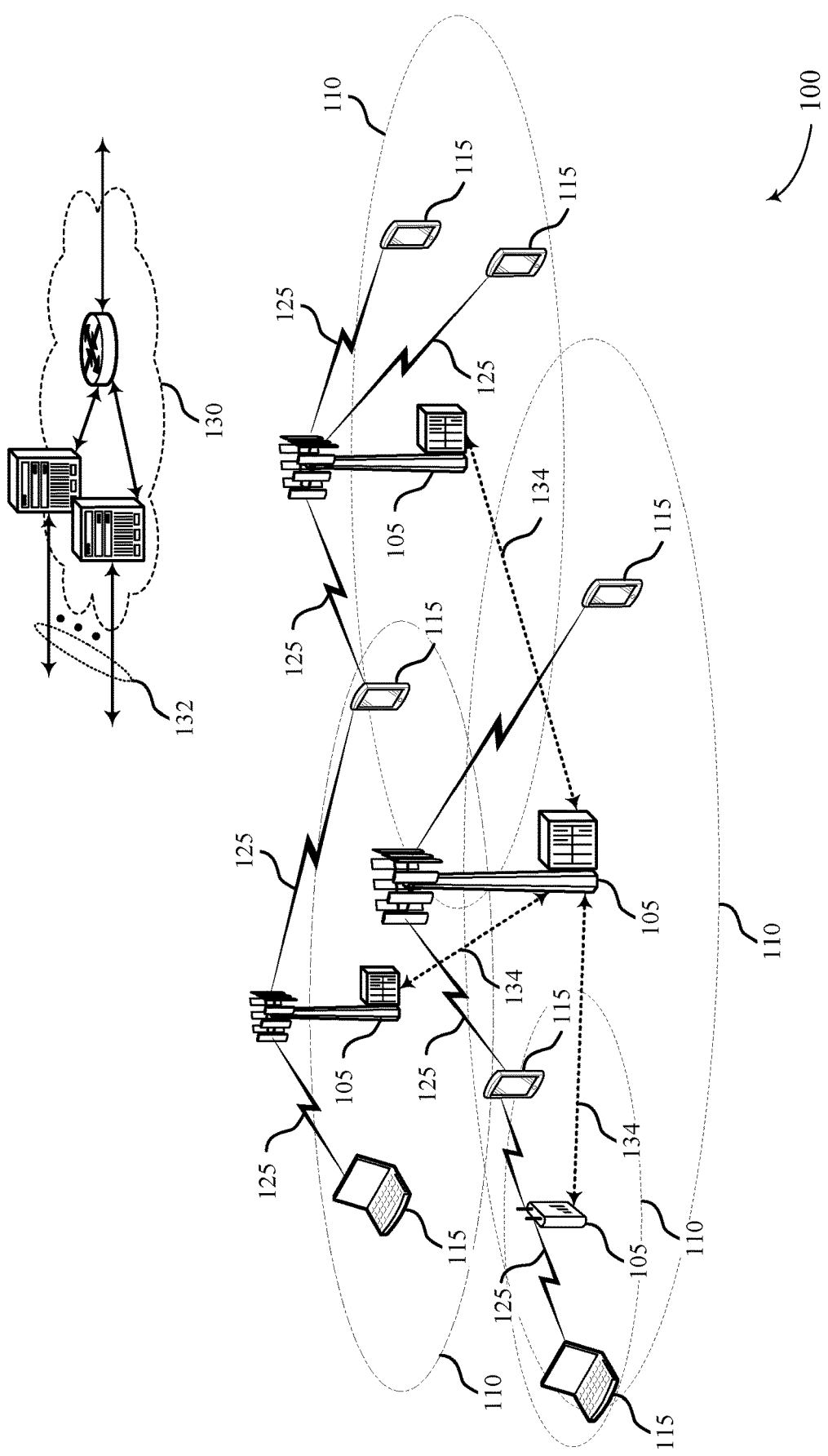
FIG. 1 illustrates an example of a system for wireless communication that supports rate control adaptation in accordance with aspects of the present disclosure.

Channel aging may severely impact performance of wireless communication systems such as through the introduction of rate mismatch. According to the principles of this disclosure, a base station communicating with a UE in a wireless communication system may adapt rate selection to counter the impact of channel aging. Existing solutions attempt to adapt rate selection to counter the impact of channel aging by applying a single scalar channel quality indicator (CQI) backoff value across an entire interval (e.g., transmission opportunity (TxOP) or frame) including multiple transmission time intervals (TTIs) (e.g., subframes). Although the solution of applying a single scalar CQI backoff value for an entire interval may be an effective tool for selecting an appropriate modulation and coding scheme (MCS) for early TTIs in the interval, channel aging may diminish the effectiveness of this approach for later TTIs of the interval. Therefore, techniques of the present disclosure describe countering impact of channel by providing rate selection adaptation on a per-transmission time interval (TTI) or per-subframe basis.

According to a first technique, a base station may provide correction of rate mismatch on a per-subframe basis for an interval (e.g., a TxOP) having multiple subframes. Each subframe may be associated with an outer-loop for rate adaptation. In some examples, a subframe may use the outer-loop to target a block error rate (e.g., 15% block error rate). That is, a CQI backoff value may be separately selected for each subframe. A base station may obtain a first CQI backoff value based on a first set of acknowledgment messages associated with a first subframe of a first interval. The base station may set a modulation and coding scheme (MCS) of a first subframe of a second interval using the first CQI backoff value. Additionally, the base station may obtain a second CQI backoff value based on a second set of acknowledgment messages associated with a second subframe of the first interval, and set a MCS of the second subframe of the second interval using the second CQI backoff value.

According to a second technique, a base station may also provide correction of rate mismatch on a per subframe or per-TTI basis for an interval (e.g., a TXOP or a frame) that includes multiple subframes. However, in the second technique the block error rate of the outer-loop for a first subframe of the interval may function as a baseline block error rate for a remainder of subframes. That is, a computed first CQI backoff value of a first subframe serves as a baseline CQI backoff value for a remainder of subframes of the interval. Thus, for the remainder of the subframes, each individual outer-loop of these subframes targets the baseline CQI backoff value of the first subframe. For example, a base station may obtain a first CQI backoff value based on a first set of acknowledgment messages associated with a first subframe of a first interval. The base station may set a MCS of a first subframe of a second interval using the first CQI backoff value. Additionally, the base station may obtain a second CQI backoff value based on a second set of acknowledgment messages associated with a second subframe of the first interval. In the second technique, the base station may set a MCS of the second subframe of the second interval using the second CQI backoff value and the first CQI backoff value.

Aspects of the disclosure are initially described in the context of a wireless communications system. Exemplary base stations (e.g., evolved NodeBs (eNBs), next generation NodeBs (gNBs)), systems, and process flow that support rate control adaptation are then described. Aspects of the disclosure are further illustrated by and described with reference to apparatus diagrams, system diagrams, and flowcharts that relate to rate control adaptation.

FIG. 1 an example of a system for wireless communication that supports rate control adaptation in accordance with aspects of the present disclosure. System 100 may be a wireless communications system that includes base stations 105, UEs 115, and a core network 130. In some examples, the system 100 may be a LTE, LTE-Advanced (LTE-A) network, or a NR network. In some cases, system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service. The core network 130 may provide user authentication, access authorization, tracking, Internet Protocol (IP) connectivity, and other access, routing, or mobility functions.

System 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

UE 115 may transmit an acknowledgement message to base station 105. In some cases, UE 115 may transmit a first set of acknowledgement messages to base station 105. The first set of acknowledgement messages may be associated with a first subframe of a first interval. The first interval may be a first TxOP. Additionally, UE 115 may transmit a second set of acknowledgement messages to base station 105. The second set of acknowledgement messages may be associated with a second subframe of the first interval. Base station 105 may obtain a first CQI backoff value. For example, base station 105 may obtain the first CQI backoff value based on the first set of acknowledgment messages associated with the first subframe of the first interval (e.g., a first TxOP). Base station 105 may set a MCS of a first subframe of a second interval based on the first CQI backoff value. Similarly, base station 105 may obtain a second CQI backoff value. For example, base station 105 may obtain the second CQI backoff value based on the second set of acknowledgment messages associated with the second subframe of the first interval. According to a first technique, base station 105 may obtain the second CQI backoff value based on the second set of acknowledgment messages associated with the second subframe of the first interval, and set a MCS of a second subframe of the second interval based on the second CQI backoff value. Alternatively, according to a second technique, base station 105 may obtain the second CQI backoff value based on the second set of acknowledgment messages, associated with the second subframe of the first interval, and the first CQI backoff value. As a result, base station 105 may set the MCS of the second subframe of the second interval.

In some cases, system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and base station 105, or core network 130 supporting radio bearers for user plane data. At the Physical (PHY) layer, transport channels may be mapped to physical channels.

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

System 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, system 100 may utilize both licensed and unlicensed radio frequency spectrum bands. For example, system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
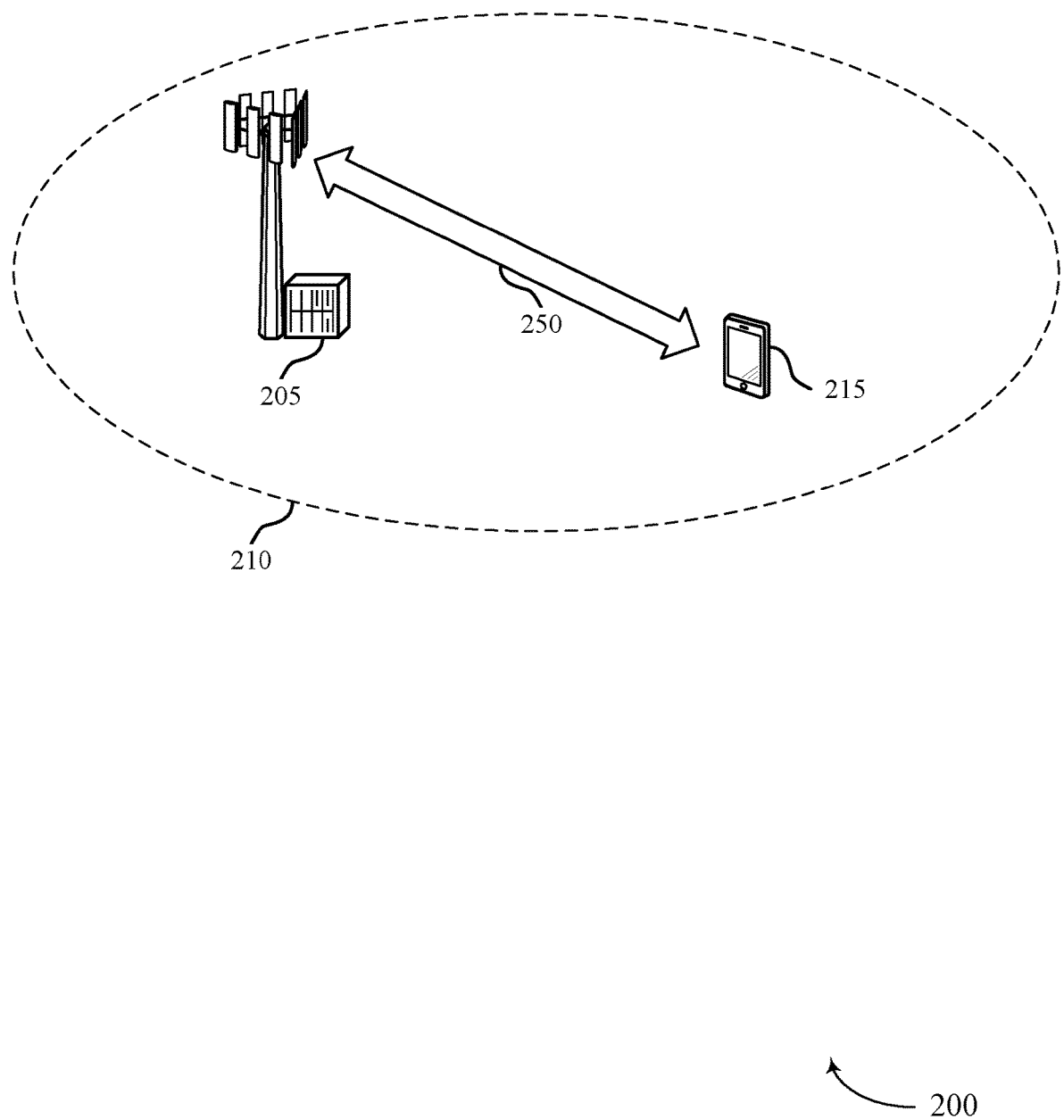
FIG. 2 illustrates an example of a system for wireless communication that supports rate control adaptation in accordance with aspects of the present disclosure.

FIG. 2 illustrates an example of a system 200 for wireless communication that supports rate control adaptation in accordance with aspects of the present disclosure. In some examples, system 200 may implement aspects of system 100. System 200 may include a base station 205 and a UE 215, which may be examples of the corresponding devices described with reference to FIG. 1. In some examples, the system 200 may implement an NR or other 5G cellular network.

UE 215 may establish a connection (e.g., bidirectional link 250) with base station 205. Base station 205 and UE 215 may communicate via the bidirectional link 250 within coverage area 210. Base station 205 and UE 215 may exchange multiple frames via the bidirectional link 250. In some cases, the bidirectional link 250 may be used for rate control adaptation. According to a first technique, base station 205 may provide correction of rate mismatch per subframe for a TxOP. Each subframe may include an outer-loop for rate adaptation. In some examples, a subframe may use the outer-loop to target a block error rate (e.g., 15% block error rate).

In some examples, base station 205 may set an initial MCS for UE 215. For example, base station 205 may set an initial MCS for UE 215 that may be determined during a connection establishment procedure (e.g., RACH procedure). Subsequent to the connection establishment procedure, base station 205 may transmit one or more DL frames to UE 215 during a first interval (e.g., TxOP), via bidirectional link 250. In some cases, the first interval may include a plurality of subframes associated with a frame. The first interval may also include a plurality of frames. Each frame may include ten 1 ms subframes numbered from 0 to 9. A subframe may be further divided into two 0.5 ms slots, each of which contains 6 or 7 modulation symbol periods. Excluding the cyclic prefix, each symbol may contain 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs). The first interval may also be a TxOP. During the first interval, UE 215 may report a CQI value to base station 205 via bidirectional link 250. The CQI value may indicate a quality of the bidirectional link 250.

UE 215 may also transmit a set of acknowledgment messages to base station 205. In some cases, the set of acknowledgement messages may be in response to the one or more DL frames received by UE 215 from base station 205. In some examples, UE 215 may transmit the set of acknowledgment messages in multiple subframes to base station 205. For example, UE 215 may generate hybrid automatic repeat request (HARD) positive acknowledgements (ACKs) or negative acknowledgements (NACKs), which UE 215 may transmit to base station 205 on a PUCCH using one or more subframes (e.g., subframes n+1, where n is an integer). Base station 205 may receive the first set of acknowledgment messages from UE 215 during the first interval. In some cases, an acknowledgment message of the set may correspond to a corresponding subframe. For example, for a transmission frame including ten 1 ms subframes numbered from 0 to 9, UE 215 may transmit an acknowledgment message during subframe 5; but the acknowledgment message may be associated with a transmission or reception of subframe 2. The first set of acknowledgment messages may, in some cases, include a subset of ACKs or a subset of NACKs, or both. Alternatively, the first set of acknowledgment messages may include only ACKs or NACKs.

In some cases, base station 205 may obtain a first CQI backoff value based on the first set of acknowledgement messages associated with the first subframe of the first interval. Base station 205 may use the set of acknowledgement messages of the first subframe as feedback to compute the first CQI backoff value. The first CQI backoff value computed by base station 205 may be applied for rate control of a first subframe in a subsequent interval (e.g., a subsequent TxOP). Upon obtaining the first CQI backoff value, base station 205 may set a MCS of a first subframe of a second interval using the first CQI backoff value. Similarly, the second interval may include a plurality of subframes associated with a frame; each frame may include a number of subframes with a predetermined duration (e.g., ten 1 ms subframes numbered from 0 to 9). The second interval may also be a TxOP.

Base station 205 may obtain a second CQI backoff value based on a second set of acknowledgment messages associated with a second subframe of the first interval, and set a MCS of the second subframe of the second interval using the second CQI backoff value. Setting the MCS of a first subframe and a second subframe of a second interval using the corresponding first CQI backoff value and the corresponding second CQI backoff value may correct rate mismatch due to channel aging across these subframes. This is a result of CQI backoff values applied to subframes during a current interval (e.g., TxOP) being computed based on reported CQI values and ACK/NACKs of the subframes of a previous interval (e.g., TxOP). In other words, the reported CQI values of a previous interval become a baseline CQI value for a current interval.

Returning to the case of base station 205 setting a MCS of a first subframe of a second interval using the first CQI backoff value. Base station 205 may compute the first CQI backoff value and set the MCS of a first subframe of a second interval using the following equation:

$$\Delta_\ell^{base} \leftarrow \min\left(\max\left(\Delta_\ell^{base} + \frac{n_{\ell,ACK}^0}{r} \cdot \Delta_{ACK} - \frac{n_{\ell,NACK}^0}{r} \cdot \Delta_{NACK}, \tilde{\Delta}_{min}\right), \tilde{\Delta}_{max}\right) \quad (1)$$

where $\Delta_\ell^{base}$ represents the baseline CQI backoff value, in decibel (dB) from a subframe of a previous interval, r represents a rank selected for a scheduled link l, $n_{l,ACK}^0$ and $n_{l,NACK}^0$ are the set of acknowledgement messages associated with the first subframe and received during the first interval.

Using equation (1), base station 205 may scale a number of ACKs in the first set of acknowledgment messages by the rank r associated with the first subframe. Additionally, base station 205 may scale a number of NACKs in the first set of acknowledgment messages by the rank r associated with the first subframe. As a result, base station 205 may determine the first CQI backoff value based on the scaled number of ACKs and the scaled number of NACKs in the first set of acknowledgment messages. $\Delta_{ACK}$, $\Delta_{NACK}$, $\Delta_{min}$, and $\Delta_{max}$ of equation (1) may be boundary constants applied to computed CQI backoff value. In some examples, the variables of equation (1) may be a scalar or a vector. Base station 205 may obtain an effective CQI value based on a reported CQI value and the computed first CQI backoff value. Base station 205 may modify a code rate for UE 215. The code rate may represent how effectively data can be exchanged between base station 205 and UE 215. In some cases, the code rate may be expressed as an index. An example of a code rate index may be a MCS index. Base station 205 may map the effective CQI value to an MCS index. Base station 205 therefore may set a MCS of a subframe of a subsequent interval based on the effective CQI value.

According to a second technique, base station 205 may also provide correction of rate mismatch per subframe for a TxOP. However, in the second technique the actual block error rate as the result of the outer-loop for a first subframe may function as a baseline block error rate for a remainder of subframes. That is, a computed first CQI backoff value of a first subframe serves as a baseline CQI backoff value for a remainder of subframes of a frame. Thus, for the remainder of the subframes of the frame, each individual outer-loop of these subframes targets the baseline CQI backoff value of the first subframe. For example, base station 205 may obtain a first CQI backoff value based on a first set of acknowledgement messages associated with a first subframe of a first interval. In some cases, the subframe may be also known as a TTI. The first interval may also be a TxOP including a plurality of subframes. UE 215 may transmit the set of acknowledgment messages in multiple subframes to base station 205. For example, UE 215 may generate HARQ ACKs or NACKs, which UE 215 may transmit to base station 205 on a PUCCH using one or more subframe.

Base station 205 may receive the first set of acknowledgment messages from UE 215 during the first interval, and determine a first CQI backoff value based on the first set of acknowledgement messages received from UE 215. For example, base station 205 may compute the first CQI backoff value using equation (1). Upon obtaining the first CQI backoff value, base station 205 may set a MCS of a first subframe of a second interval using the first CQI backoff value. Similarly, the second interval may include a plurality of subframes of a frame. The second interval may also be a TxOP including the plurality of subframes.

UE 215 may transmit a second set of acknowledgment messages to base station 205. Base station 205 may obtain a second CQI backoff value based on the second set of acknowledgment messages associated with a second subframe of the first interval. According to the second technique, base station 205 may set a MCS of the second subframe of the second interval using the second CQI backoff value and the first CQI backoff value. As such, setting the MCS of the second subframe of the second interval using the first CQI backoff value and the second CQI backoff value may correct rate mismatch due to channel aging.

Returning to the case of base station 205 setting a MCS of the second subframe of the second interval using the second CQI backoff value. Base station 205 may compute the second CQI backoff value based on the second set of acknowledgment messages associated with the second subframe of the first interval using the following equation:

$$\Delta_\ell^k \leftarrow \min\left(\max\left(\Delta_\ell^k + \frac{n_{\ell,ACK}^k - n_{\ell,ACK}^0}{r} \cdot \delta(n_{\ell,ACK}^k - n_{\ell,ACK}^0, k), \tilde{\Delta}_{min}\right), \tilde{\Delta}_{max}\right) \quad (2)$$

where $\Delta_\ell^k$ represents the additional CQI backoff value, in dB from a subframe of a previous interval, r represents a rank selected for a scheduled link l, and $\tilde{\Delta}_{min}$ and $\tilde{\Delta}_{max}$ may be constant bounds. In some examples, the variables of equation (1) may be a scalar or vector. The $n<_{l,ACK}{}^{k}-n_{l,ACK}{}^{0}$ term in equation (2) may represent base station 205 computing a difference between a number of ACKs in the first set of acknowledgment messages and a number of ACKs in the second set of acknowledgment messages associated with the first subframe and second subframe of the first interval. Base station 205 may determine the second CQI backoff value based on the scaled difference between the number of ACKs in the first set of acknowledgment messages and the number of ACKs in the second set of acknowledgment messages. The $\delta(n_{l,ACK}{}^{k}-n_{l,ACK}{}^{0}, k)$ term in equation (2) may be a function of $n_{l,ACK}{}^{k}-n_{l,ACK}{}^{0}$ and a subframe index k. In some cases, the $\delta(n_{l,ACK}{}^{k}-n_{l,ACK}{}^{0}, k)$ term may be a constant. Base station 205 may obtain an effective CQI value based on $\Delta_l^{base}+\Delta_l^k$. As a result, base station 205 may set a MCS of a subframe of an interval based on the computed $\Delta_l^{base}+\Delta_l^k$. Thus, in the second technique the CQI backoff value as the result of the outer-loop for a first subframe of a frame may function as a baseline CQI backoff value for a remainder of subframes.

Figure 3:
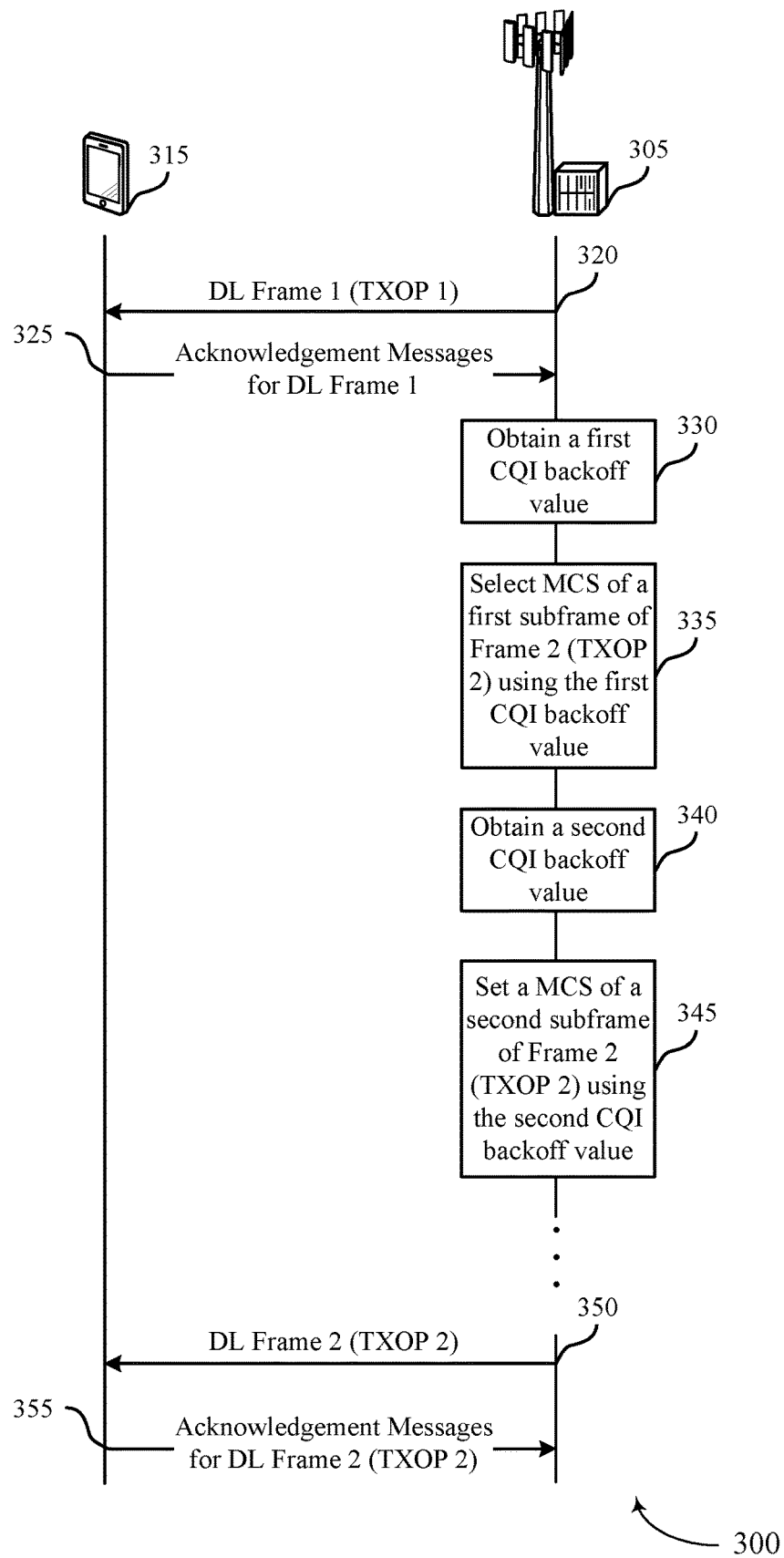
FIG. 3 illustrates an example of a process flow that supports rate control adaptation in accordance with aspects of the present disclosure.

FIG. 3 illustrates an example of a process flow 300 that supports rate control adaptation in accordance with aspects of the present disclosure. In some examples, process flow 300 may implement aspects of system 100 and 200. Base station 305 UE 315 may be examples of the corresponding devices described with reference to FIGS. 1 and 2.

In the following description of the process flow 300, the operations between the base station 305 and UE 315 may be transmitted in a different order than the exemplary order shown, or the operations performed by base station 305 and UE 315 may be performed in different orders or at different times. Certain operations may also be left out of the process flow 300, or other operations may be added to the process flow 300. In some examples, process flow 300 may commence with base station 305 establishing a connection with UE 315. Base station 305 may provide radio resources to UE 315 for respective UL communications. Additionally or alternatively, base station 305 may also provide radio resources to UE 315 for respective DL communications.

At 320, base station 305 may transmit a DL Frame 1 during a first interval. In some cases, the DL Frame 1 may include a plurality of subframes. For example, DL Frame 1 may include ten 1 ms subframes numbered from 0 to 9. In some cases, the subframes may be the smallest scheduling unit, also known as a TTI. The first interval may also be a TxOP.

At 325, UE 315 may transmit acknowledgement messages for DL Frame 1 to base station 305. For example, UE 315 may generate HARQ ACK(s) or NACK(s), which UE 315 may transmit to base station 305 on a PUCCH using one or more subframes (e.g., subframes n+4, where n is an integer). Base station 305 may receive the acknowledgement messages for DL Frame 1. At block 330, base station 305 may obtain a first CQI backoff value. In some cases, base station 305 may obtain the first CQI backoff value based on the received acknowledgement messages for DL Frame 1. At block 335, base station 305 may select MCS of a first subframe of a Frame 2 (e.g., TxOP 2) using the first CQI backoff value.

At block 340, base station 305 may obtain a second CQI backoff value. The second CQI backoff value may be associated with a second subframe of DL Frame 1 associated with the first interval. According to a first technique, base station 305 may obtain the second CQI backoff value based on the acknowledgement messages of subframe 2 for DL Frame 1. Alternatively, according to a second technique, base station 305 may obtain the second CQI backoff value based on the acknowledgement messages of subframe 2 for DL Frame 1 and the first CQI backoff value. At block 345, base station 305 may set a MCS of a second subframe of Frame 2 (TxOP 2) using the second CQI backoff value.

At 350, base station 305 may transmit a DL Frame 2 during a second interval (e.g., TxOP 2). Similarly, DL Frame 2 may include a plurality of subframes. At 355, UE 315 may transmit acknowledgement messages for DL Frame 2 to base station 305.

Figure 4:
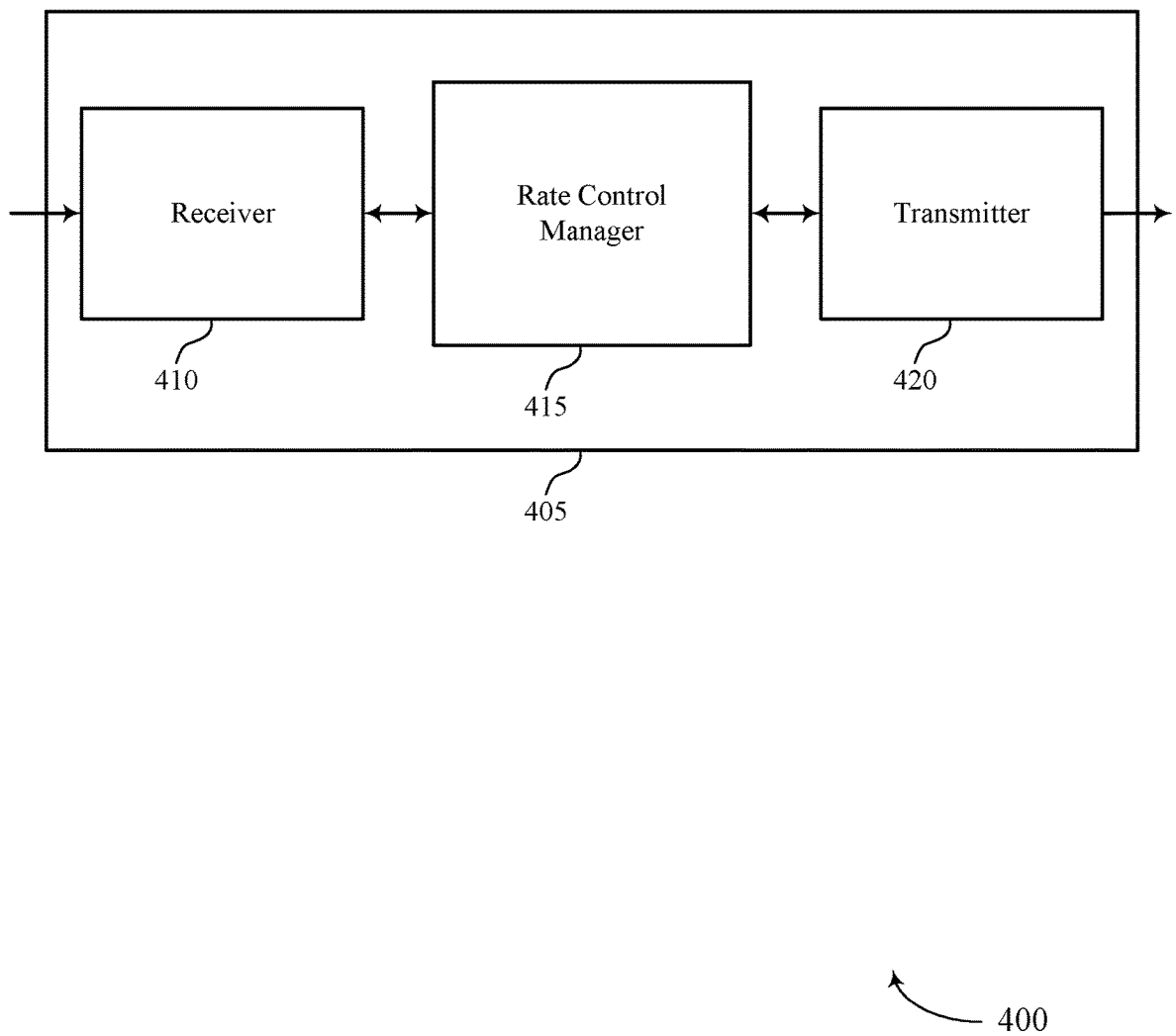
FIGS. 4 through 6 show block diagrams of a device that supports rate control adaptation in accordance with aspects of the present disclosure.

FIG. 4 shows a block diagram 400 of a wireless device 405 that supports rate control adaptation in accordance with aspects of the present disclosure. Wireless device 405 may be an example of aspects of a base station 105 as described herein. Wireless device 405 may include receiver 410, rate control manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to rate control adaptation, etc.). Information may be passed on to other components of the device. The receiver 410 may be an example of aspects of the transceiver 735 described with reference to FIG. 7. The receiver 410 may utilize a single antenna or a set of antennas.

Rate control manager 415 may be an example of aspects of the rate control manager 715 described with reference to FIG. 7. Rate control manager 415 and/or at least some of its various sub-components may be implemented in hardware, software executed by a processor, firmware, or any combination thereof. If implemented in software executed by a processor, the functions of the rate control manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The rate control manager 415 and/or at least some of its various sub-components may be physically located at various positions, including being distributed such that portions of functions are implemented at different physical locations by one or more physical devices. In some examples, rate control manager 415 and/or at least some of its various sub-components may be a separate and distinct component in accordance with various aspects of the present disclosure. In other examples, rate control manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Rate control manager 415 may obtain a first CQI backoff value based on a first set of acknowledgment messages associated with a first subframe of a first interval, and set a MCS of a first subframe of a second interval using the first CQI backoff value. In some cases, rate control manager 415 may obtain a second CQI backoff value based on a second set of acknowledgment messages associated with a second subframe of the first interval, and set a MCS of the second subframe of the second interval using the second CQI backoff value.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
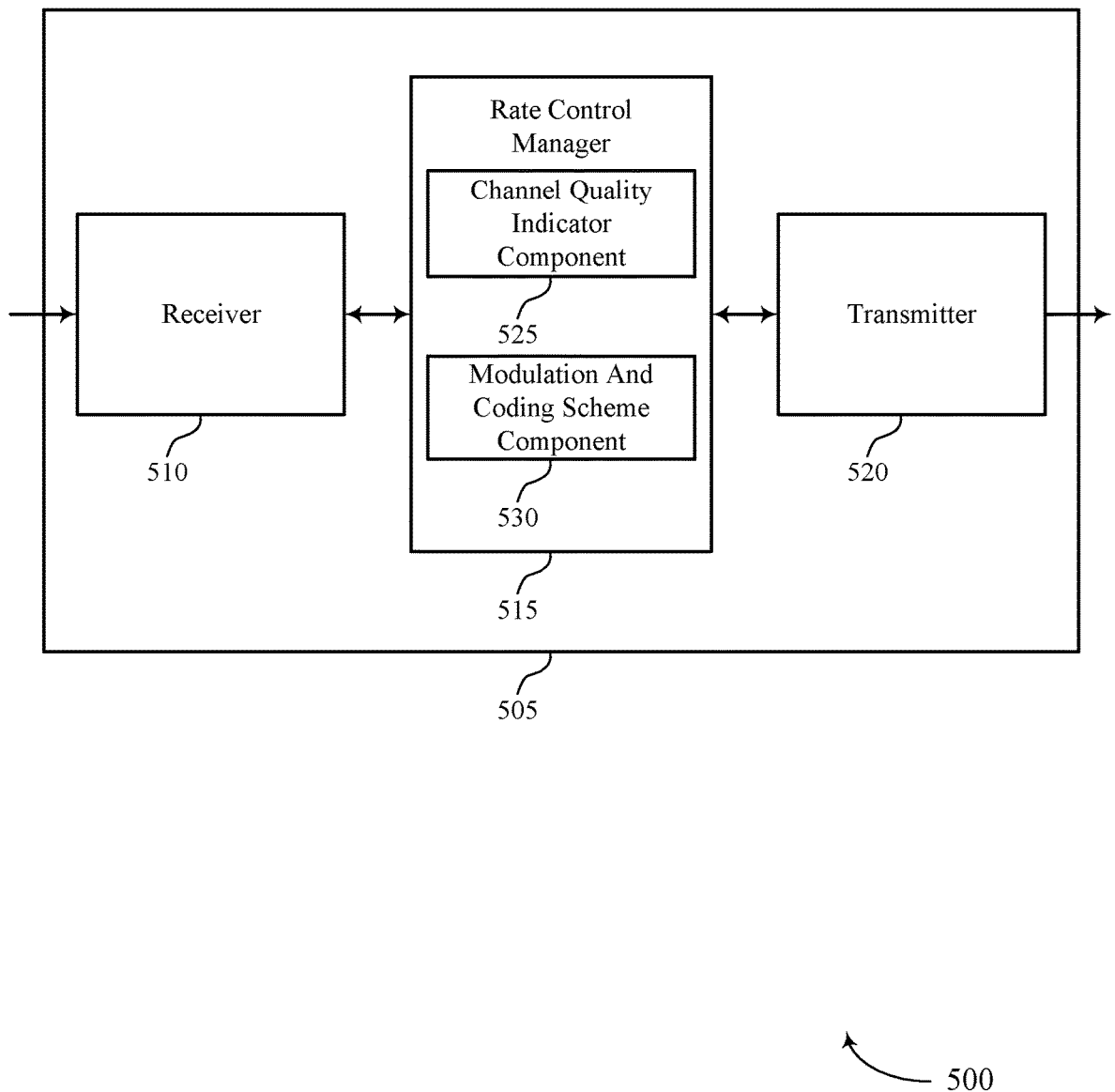

FIG. 5 shows a block diagram 500 of a wireless device 505 that supports rate control adaptation in accordance with aspects of the present disclosure. Wireless device 505 may be an example of aspects of a wireless device 405 or a base station 105 as described with reference to FIG. 4. Wireless device 505 may include receiver 510, rate control manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to rate control adaptation, etc.). Information may be passed on to other components of the device. The receiver 510 may be an example of aspects of the transceiver 735 described with reference to FIG. 7. The receiver 510 may utilize a single antenna or a set of antennas.

Rate control manager 515 may be an example of aspects of the rate control manager 715 described with reference to FIG. 7. Rate control manager 515 may also include channel quality indicator component 525 and modulation and coding scheme component 530. Channel quality indicator component 525 may obtain a first CQI backoff value based on a first set of acknowledgment messages associated with a first subframe of a first interval. Channel quality indicator component 525 may also obtain a second CQI backoff value based on a second set of acknowledgment messages associated with a second subframe of the first interval.

In some cases, channel quality indicator component 525 may determine the first CQI backoff value as an incremental step with respect to an initial value of a baseline CQI backoff value, and constrain the first CQI backoff value and the second CQI backoff value by a constant lower bound, a constant upper bound, or a combination thereof. In some cases, obtaining the second CQI backoff value may be further based on the first CQI backoff value. In some cases, the first CQI backoff value and the second CQI backoff value target the block error rate of the first subframe for the second subframe and the third subframe. In some cases, the first interval or the second interval, or both includes a set of subframes. In some cases, the first interval or the second interval, or both includes a TxOP including the set of subframes.

Modulation and coding scheme component 530 may set a MCS of a first subframe of a second interval using the first CQI backoff value and set a MCS of the second subframe of the second interval using the second CQI backoff value. In some cases, modulation and coding scheme component 530 may map the effective CQI value to an MCS index.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
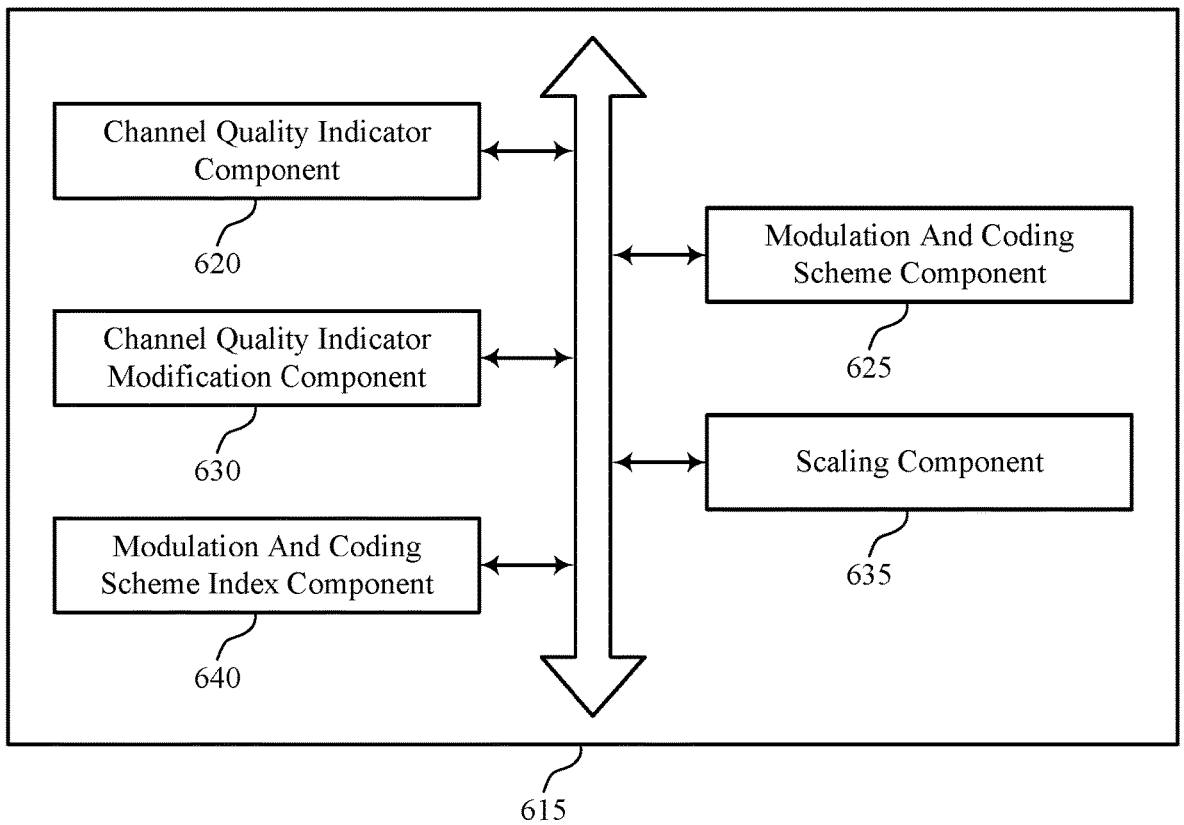

FIG. 6 shows a block diagram 600 of a rate control manager 615 that supports rate control adaptation in accordance with aspects of the present disclosure. The rate control manager 615 may be an example of aspects of a rate control manager 415, a rate control manager 515, or a rate control manager 715 described with reference to FIGS. 4, 5, and 7. The rate control manager 615 may include channel quality indicator component 620, modulation and coding scheme component 625, channel quality indicator modification component 630, scaling component 635, and modulation and coding scheme index component 640. Each of these modules may communicate, directly or indirectly, with one another (e.g., via one or more buses).

Channel quality indicator component 620 may obtain a first CQI backoff value based on a first set of acknowledgment messages associated with a first subframe of a first interval. The channel quality indicator component 620 may also obtain a second CQI backoff value based on a second set of acknowledgment messages associated with a second subframe of the first interval. In some cases, the channel quality indicator component 620 may determine the first CQI backoff value as an incremental step with respect to an initial value of a baseline CQI backoff value. In some examples, the channel quality indicator component 620 may constrain the first CQI backoff value and the second CQI backoff value by a constant lower bound, a constant upper bound, or a combination thereof. In some cases, obtaining the second CQI backoff value may be based on the first CQI backoff value. In some cases, the first CQI backoff value and the second CQI backoff value target the block error rate of the first subframe for the second subframe and the third subframe. In some cases, the first interval or the second interval, or both includes a plurality of subframes. In some cases, the first interval or the second interval, or both includes a TxOP including the plurality of subframes.

Modulation and coding scheme component 625 may set a MCS of a first subframe of a second interval using the first CQI backoff value, set a MCS of the second subframe of the second interval using the second CQI backoff value. In some cases, modulation and coding scheme component 625 may obtain an effective CQI value based on a reported CQI value and the first CQI backoff value. Channel quality indicator modification component 630 may modify the baseline CQI backoff value based on the first CQI backoff value and determine the second CQI backoff value as an incremental step with respect to the modified baseline CQI backoff value.

Scaling component 635 may scale a number of positive acknowledgments in the first set of acknowledgment messages by a rank associated with the first subframe. The scaling component 635 may scale a number of negative acknowledgments in the first set of acknowledgment messages by the rank associated with the first subframe. In some cases, scaling component 635 may determine the first CQI backoff value based on the scaled number of positive acknowledgments and the scaled number of negative acknowledgments in the first set of acknowledgment messages.

Scaling component 635 may scale a difference between a number of positive acknowledgments in the first set of acknowledgment messages and a number of positive acknowledgments in the second set of acknowledgment messages by a rank associated with the first subframe and second subframe associated with the first interval, and determine the second CQI backoff value based on the scaled difference between the number of positive acknowledgments in the first set of acknowledgment messages and the number of positive acknowledgments in the second set of acknowledgment messages. In some cases, determining the first CQI backoff value may be based on a reported CQI value associated with the first subframe of the first interval. In some cases, determining the second CQI backoff value may be further based on a reported CQI value associated with the second subframe of the first interval. Modulation and coding scheme index component 640 may map the effective CQI value to an MCS index.

Figure 7:
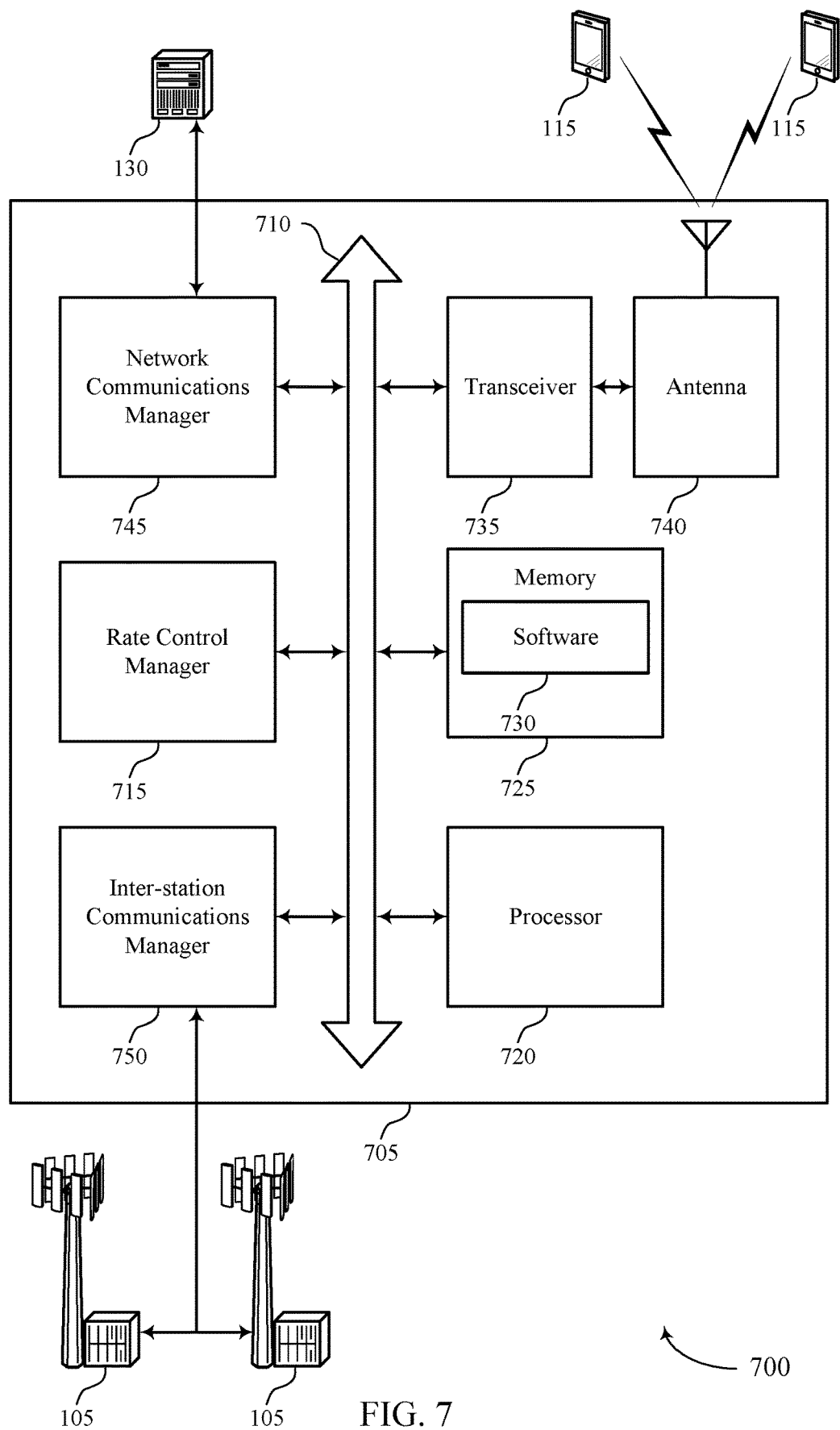
FIG. 7 illustrates a block diagram of a system including a base station that supports rate control adaptation in accordance with aspects of the present disclosure.

FIG. 7 shows a diagram of a system 700 including a device 705 that supports rate control adaptation in accordance with aspects of the present disclosure. Device 705 may be an example of or include the components of wireless device 405, wireless device 505, or a base station 105 as described above, e.g., with reference to FIGS. 4 and 5. Device 705 may include components for bi-directional voice and data communications including components for transmitting and receiving communications, including rate control manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more user equipment (UE)s 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting rate control adaptation).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support rate control adaptation. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an Long Term Evolution (LTE)/LTE-A wireless communication network technology to provide communication between base stations 105.

Figure 8:
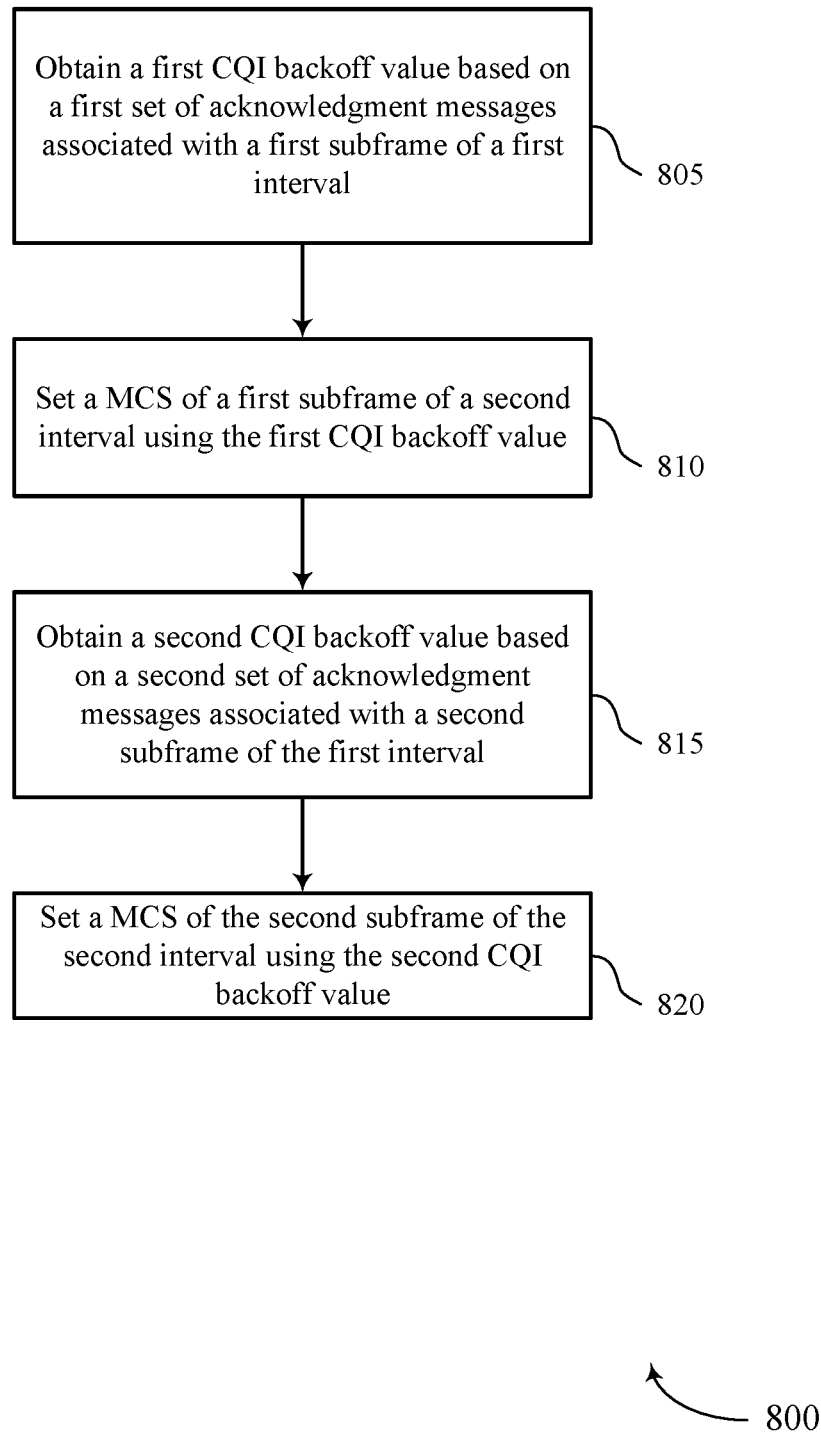
FIGS. 8 through 10 illustrate methods for rate control adaptation in accordance with aspects of the present disclosure.

FIG. 8 shows a flowchart illustrating a method 800 for rate control adaptation in accordance with aspects of the present disclosure. The operations of method 800 may be implemented by a base station 105 or its components as described herein. For example, the operations of method 800 may be performed by a rate control manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 805 the base station 105 may obtain a first CQI backoff value based on a first set of acknowledgment messages associated with a first subframe of a first interval. In some examples, the first set of acknowledgment messages may include a subset of ACKs or a subset of NACKs, or both. Alternatively, the first set of acknowledgment messages may include only ACKs or NACKs. Base station 105 may receive the first set of acknowledgment messages from a UE. The first interval may include a plurality of subframes including the first subframe. The operations of block 805 may be performed according to the methods described herein. In certain examples, aspects of the operations of block 805 may be performed by a channel quality indicator component as described with reference to FIGS. 4 through 7.

At block 810 the base station 105 may set a MCS of a first subframe of a second interval using the first CQI backoff value. Similarly, the second interval may also include a plurality of subframes including the first subframe. The second interval may be a TxOP including the plurality of subframes. The operations of block 810 may be performed according to the methods described herein. In certain examples, aspects of the operations of block 810 may be performed by a modulation and coding scheme component as described with reference to FIGS. 4 through 7.

At block 815 the base station 105 may obtain a second CQI backoff value based on a second set of acknowledgment messages associated with a second subframe of the first interval. The operations of block 815 may be performed according to the methods described herein. In certain examples, aspects of the operations of block 815 may be performed by a channel quality indicator component as described with reference to FIGS. 4 through 7.

At block 820 the base station 105 may set a MCS of the second subframe of the second interval using the second CQI backoff value. The operations of block 820 may be performed according to the methods described herein. In certain examples, aspects of the operations of block 820 may be performed by a modulation and coding scheme component as described with reference to FIGS. 4 through 7.

Figure 9:
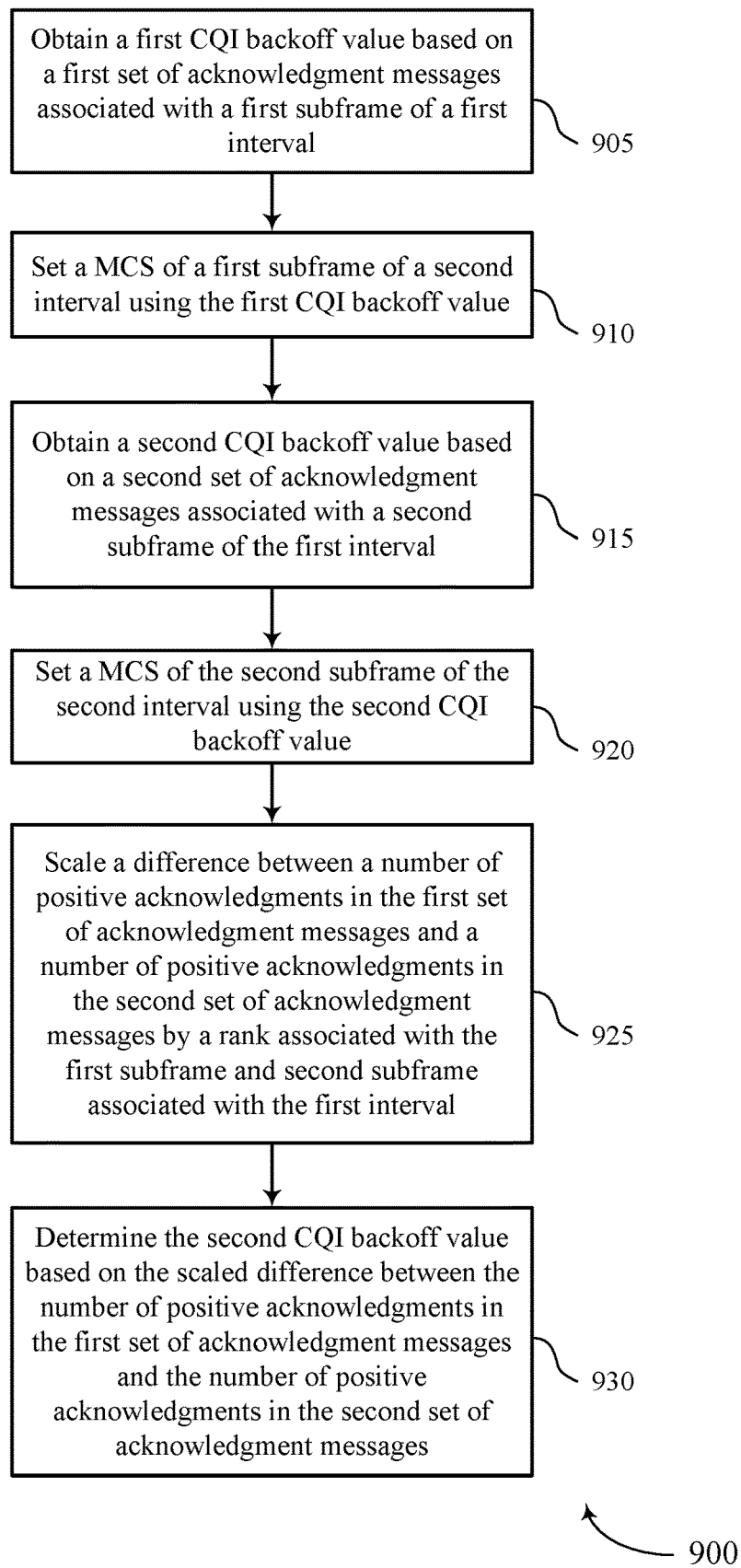

FIG. 9 shows a flowchart illustrating a method 900 for rate control adaptation in accordance with aspects of the present disclosure. The operations of method 900 may be implemented by a base station 105 or its components as described herein. For example, the operations of method 900 may be performed by a rate control manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 905 the base station 105 may obtain a first CQI backoff value based on a first set of acknowledgment messages associated with a first subframe of a first interval. In some examples, the first set of acknowledgment messages may include a subset of ACKs or a subset of NACKs, or both. Alternatively, the first set of acknowledgment messages may include only ACKs or NACKs. Base station 105 may receive the first set of acknowledgment messages from a UE. The first interval may include a plurality of subframes including the first subframe. Additionally, the first interval may be a TxOP including the plurality of subframes. The operations of block 905 may be performed according to the methods described herein. In certain examples, aspects of the operations of block 905 may be performed by a channel quality indicator component as described with reference to FIGS. 4 through 7.

At block 910 the base station 105 may set a MCS of a first subframe of a second interval using the first CQI backoff value. Similarly, the second interval may also include a plurality of subframes including the first subframe. The second interval may be a TxOP including the plurality of subframes. In some examples, the first interval and the second interval may be consecutive intervals. That is, the second interval may occur immediately after the first interval. The operations of block 910 may be performed according to the methods described herein. In certain examples, aspects of the operations of block 910 may be performed by a modulation and coding scheme component as described with reference to FIGS. 4 through 7.

At block 915 the base station 105 may obtain a second CQI backoff value based on a second set of acknowledgment messages associated with a second subframe of the first interval. In some examples, the second set of acknowledgment messages may include a subset of ACKs or a subset of NACKs, or both. Alternatively, the second set of acknowledgment messages may include only ACKs or NACKs. Base station 105 may receive the second set of acknowledgment messages from a UE. The operations of block 915 may be performed according to the methods described herein. In certain examples, aspects of the operations of block 915 may be performed by a channel quality indicator component as described with reference to FIGS. 4 through 7.

At block 920 the base station 105 may set a MCS of the second subframe of the second interval using the second CQI backoff value. The operations of block 920 may be performed according to the methods described herein. In certain examples, aspects of the operations of block 920 may be performed by a modulation and coding scheme component as described with reference to FIGS. 4 through 7.

At block 925 the base station 105 may scale a difference between a number of positive acknowledgments in the first set of acknowledgment messages and a number of positive acknowledgments in the second set of acknowledgment messages by a rank associated with the first subframe and second subframe associated with the first interval. The operations of block 925 may be performed according to the methods described herein. In certain examples, aspects of the operations of block 925 may be performed by a scaling component as described with reference to FIGS. 4 through 7.

At block 930 the base station 105 may determine the second CQI backoff value based on the scaled difference between the number of positive acknowledgments in the first set of acknowledgment messages and the number of positive acknowledgments in the second set of acknowledgment messages. The operations of block 930 may be performed according to the methods described herein. In certain examples, aspects of the operations of block 930 may be performed by a scaling component as described with reference to FIGS. 4 through 7.

Figure 10:
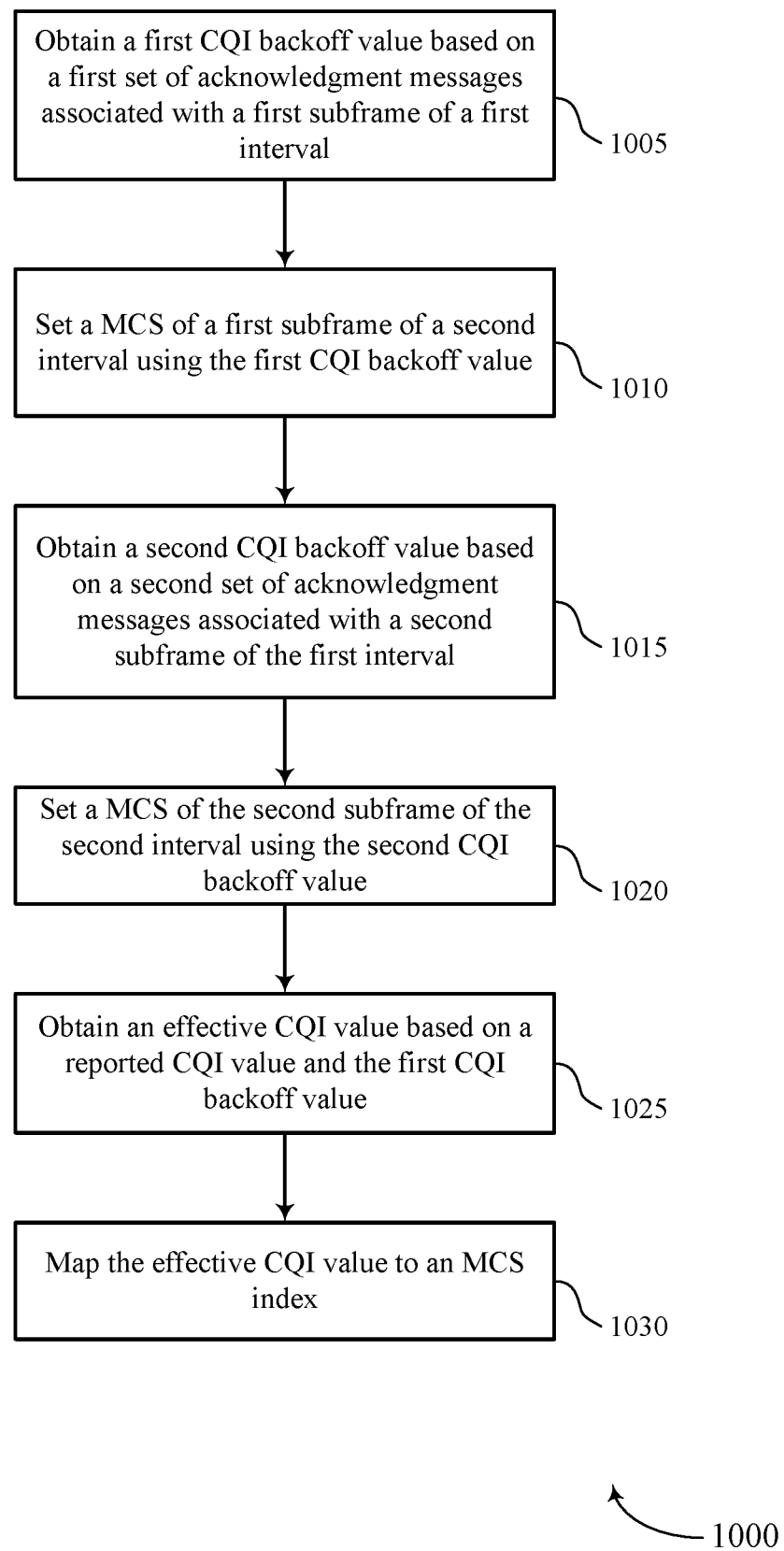

FIG. 10 shows a flowchart illustrating a method 1000 for rate control adaptation in accordance with aspects of the present disclosure. The operations of method 1000 may be implemented by a base station 105 or its components as described herein. For example, the operations of method 1000 may be performed by a rate control manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1005 the base station 105 may obtain a first CQI backoff value based on a first set of acknowledgment messages associated with a first subframe of a first interval. In some examples, the first set of acknowledgment messages may include a subset of ACKs or a subset of NACKs, or both. Alternatively, the first set of acknowledgment messages may include only ACKs or NACKs. Base station 105 may receive the first set of acknowledgment messages from a UE. The first interval may include a plurality of subframes including the first subframe. Additionally, the first interval may be a TxOP including the plurality of subframes. The operations of block 1005 may be performed according to the methods described herein. In certain examples, aspects of the operations of block 1005 may be performed by a channel quality indicator component as described with reference to FIGS. 4 through 7.

At block 1010 the base station 105 may set a MCS of a first subframe of a second interval using the first CQI backoff value. Similarly, the second interval may also include a plurality of subframes including the first subframe. The second interval may be a TxOP including the plurality of subframes. In some examples, the first interval and the second interval may be consecutive intervals. That is, the second interval may occur immediately after the first interval. The operations of block 1010 may be performed according to the methods described herein. In certain examples, aspects of the operations of block 1010 may be performed by a modulation and coding scheme component as described with reference to FIGS. 4 through 7.

At block 1015 the base station 105 may obtain a second CQI backoff value based on a second set of acknowledgment messages associated with a second subframe of the first interval. In some examples, the second set of acknowledgment messages may include a subset of ACKs or a subset of NACKs, or both. Alternatively, the second set of acknowledgment messages may include only ACKs or NACKs. Base station 105 may receive the second set of acknowledgment messages from a UE. The operations of block 1015 may be performed according to the methods described herein. In certain examples, aspects of the operations of block 1015 may be performed by a channel quality indicator component as described with reference to FIGS. 4 through 7.

At block 1020 the base station 105 may set a MCS of the second subframe of the second interval using the second CQI backoff value. The operations of block 1020 may be performed according to the methods described herein. In certain examples, aspects of the operations of block 1020 may be performed by a modulation and coding scheme component as described with reference to FIGS. 4 through 7.

At block 1025 the base station 105 may obtain an effective CQI value based on a reported CQI value and the first CQI backoff value. The operations of block 1025 may be performed according to the methods described herein. In certain examples, aspects of the operations of block 1025 may be performed by a modulation and coding scheme index component as described with reference to FIGS. 4 through 7.

At block 1030 the base station 105 may map the effective CQI value to an MCS index. The operations of block 1030 may be performed according to the methods described herein. In certain examples, aspects of the operations of block 1030 may be performed by a modulation and coding scheme component as described with reference to FIGS. 4 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    obtaining a first channel quality indicator (CQI) backoff value based at least in part on a first set of acknowledgment messages associated with a first subframe of a first interval;
    obtaining a second CQI backoff value based at least in part on a second set of acknowledgment messages associated with a second subframe of the first interval;
    constraining the first CQI backoff value and the second CQI backoff value by a constant lower bound, a constant upper bound, or a combination thereof;
    setting a modulation and coding scheme (MCS) of a first subframe of a second interval using the first CQI backoff value; and
    setting a MCS of the second subframe of the second interval using the second CQI backoff value.

2. The method of claim 1, wherein obtaining the second CQI backoff value is further based at least in part on the first CQI backoff value.

3. The method of claim 1, further comprising:
determining the first CQI backoff value as an incremental step with respect to an initial value of a baseline CQI backoff value.

4. The method of claim 3, further comprising:
modifying the baseline CQI backoff value based at least in part on the first CQI backoff value.

5. The method of claim 4, further comprising:
determining the second CQI backoff value as an incremental step with respect to the modified baseline CQI backoff value.

6. The method of claim 1, further comprising:
scaling a number of positive acknowledgments in the first set of acknowledgment messages by a rank associated with the first subframe;
scaling a number of negative acknowledgments in the first set of acknowledgment messages by the rank associated with the first subframe; and
determining the first CQI backoff value based at least in part on the scaled number of positive acknowledgments and the scaled number of negative acknowledgments in the first set of acknowledgment messages.

7. The method of claim 6, wherein determining the first CQI backoff value is further based at least in part on a reported CQI value associated with the first subframe of the first interval.

8. The method of claim 1, further comprising:
scaling a difference between a number of positive acknowledgments in the first set of acknowledgment messages and a number of positive acknowledgments in the second set of acknowledgment messages by a rank associated with the first subframe and second subframe associated with the first interval; and
determining the second CQI backoff value based at least in part on the scaled difference between the number of positive acknowledgments in the first set of acknowledgment messages and the number of positive acknowledgments in the second set of acknowledgment messages.

9. The method of claim 8, wherein determining the second CQI backoff value is further based at least in part on a reported CQI value associated with the second subframe of the first interval.

10. The method of claim 1, wherein setting the MCS of the second subframe comprises:
obtaining an effective CQI value based at least in part on a reported CQI value and the first CQI backoff value; and
mapping the effective CQI value to an MCS index.

11. The method of claim 1, wherein the first CQI backoff value and the second CQI backoff value target the block error rate of the first subframe for the second subframe and the third subframe.

12. The method of claim 1, wherein the first interval or the second interval, or both comprises a plurality of subframes.

13. The method of claim 12, wherein the first interval or the second interval, or both comprises a transmission opportunity (TxOP) including the plurality of subframes.

14. An apparatus for wireless communication, comprising:
means for obtaining a first channel quality indicator (CQI) backoff value based at least in part on a first set of acknowledgment messages associated with a first subframe of a first interval;
means for obtaining a second CQI backoff value based at least in part on a second set of acknowledgment messages associated with a second subframe of the first interval;
means for constraining the first CQI backoff value and the second CQI backoff value by a constant lower bound, a constant upper bound, or a combination thereof;
means for setting a modulation and coding scheme (MCS) of a first subframe of a second interval using the first CQI backoff value; and
means for setting a MCS of the second subframe of the second interval using the second CQI backoff value.

15. An apparatus for wireless communication, comprising:
a processor;
memory in electronic communication with the processor; and
instructions stored in the memory, wherein the instructions are executable by the processor to:
obtain a first channel quality indicator (CQI) backoff value based at least in part on a first set of acknowledgment messages associated with a first subframe of a first interval;
obtain a second CQI backoff value based at least in part on a second set of acknowledgment messages associated with a second subframe of the first interval;
constrain the first CQI backoff value and the second CQI backoff value by a constant lower bound, a constant upper bound, or a combination thereof;
set a modulation and coding scheme (MCS) of a first subframe of a second interval using the first CQI backoff value; and
set a MCS of the second subframe of the second interval using the second CQI backoff value.

16. The apparatus of claim 15, wherein the obtaining the second CQI backoff value is further based at least in part on the first CQI backoff value.

17. The apparatus of claim 15, wherein the instructions are executable by the processor to:
determine the first CQI backoff value as an incremental step with respect to an initial value of a baseline CQI backoff value.

18. The apparatus of claim 17, wherein the instructions are executable by the processor to:
modify the baseline CQI backoff value based at least in part on the first CQI backoff value.

19. The apparatus of claim 18, wherein the instructions are executable by the processor to:
determine the second CQI backoff value as an incremental step with respect to the modified baseline CQI backoff value.

20. The apparatus of claim 15, wherein the instructions are executable by the processor to:
scale a number of positive acknowledgments in the first set of acknowledgment messages by a rank associated with the first subframe;
scale a number of negative acknowledgments in the first set of acknowledgment messages by the rank associated with the first subframe; and
determine the first CQI backoff value based at least in part on the scaled number of positive acknowledgments and the scaled number of negative acknowledgments in the first set of acknowledgment messages.

21. The apparatus of claim 20, wherein determining the first CQI backoff value is further based at least in part on a reported CQI value associated with the first subframe of the first interval.

22. The apparatus of claim 15, wherein the instructions are executable by the processor to:
scale a difference between a number of positive acknowledgments in the first set of acknowledgment messages and a number of positive acknowledgments in the second set of acknowledgment messages by a rank associated with the first subframe and second subframe associated with the first interval; and
determine the second CQI backoff value based at least in part on the scaled difference between the number of positive acknowledgments in the first set of acknowledgment messages and the number of positive acknowledgments in the second set of acknowledgment messages.

23. The apparatus of claim 22, wherein determining the second CQI backoff value is further based at least in part on a reported CQI value associated with the second subframe of the first interval.

24. The apparatus of claim 15, wherein the instructions to set the MCS of the second subframe comprise instructions executable by the processor to:
obtain an effective CQI value based at least in part on a reported CQI value and the first CQI backoff value; and
map the effective CQI value to an MCS index.

25. The apparatus of claim 15, wherein the first CQI backoff value and the second CQI backoff value target the block error rate of the first subframe for the second subframe and the third subframe.

26. The apparatus of claim 15, wherein the first interval or the second interval, or both comprises a plurality of subframes.

27. The apparatus of claim 26, wherein the first interval or the second interval, or both comprises a transmission opportunity (TxOP) including the plurality of subframes.

28. A non-transitory computer readable medium storing code for wireless communication, the code comprising instructions executable to:
obtain a first channel quality indicator (CQI) backoff value based at least in part on a first set of acknowledgment messages associated with a first subframe of a first interval;
obtain a second CQI backoff value based at least in part on a second set of acknowledgment messages associated with a second subframe of the first interval;
constrain the first CQI backoff value and the second CQI backoff value by a constant lower bound, a constant upper bound, or a combination thereof;
set a modulation and coding scheme (MCS) of a first subframe of a second interval using the first CQI backoff value; and
set a MCS of the second subframe of the second interval using the second CQI backoff value.

* * * * *